(12) United States Patent
Miyasaka

(10) Patent No.: US 12,123,136 B2
(45) Date of Patent: Oct. 22, 2024

(54) RAW MATERIAL SUPPLY DEVICE

(71) Applicant: SEIKO EPSON CORPORATION, Tokyo (JP)

(72) Inventor: Yoichi Miyasaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 560 days.

(21) Appl. No.: 17/386,597

(22) Filed: Jul. 28, 2021

(65) Prior Publication Data

US 2022/0034030 A1 Feb. 3, 2022

(30) Foreign Application Priority Data

Jul. 30, 2020 (JP) .................... 2020-129623

(51) Int. Cl.
*B21B 1/10* (2006.01)
*B02C 18/22* (2006.01)
*B02C 25/00* (2006.01)
*D21B 1/10* (2006.01)

(52) U.S. Cl.
CPC ............ *D21B 1/10* (2013.01); *B02C 18/2225* (2013.01); *B02C 25/00* (2013.01); *B02C 2018/2208* (2013.01)

(58) Field of Classification Search
CPC ...................................................... D21B 1/10

USPC ......................................................... 162/286
See application file for complete search history.

(56) References Cited

U.S. PATENT DOCUMENTS

2019/0030750 A1   1/2019   Miyasaka

FOREIGN PATENT DOCUMENTS

| JP | S63-075521 | A | 4/1988 | |
|---|---|---|---|---|
| JP | 2003-155501 | A | 5/2003 | |
| JP | 2004-189408 | A | 7/2004 | |
| JP | 2019-026969 | A | 2/2019 | |
| JP | 2019-151427 | A | 9/2019 | |
| WO | WO-2017135050 | A1 * | 8/2017 | .............. B27N 3/02 |

* cited by examiner

*Primary Examiner* — Jacob T Minskey
(74) *Attorney, Agent, or Firm* — Global IP Counselors, LLP

(57) ABSTRACT

A raw material supply device includes a transport section that transports a raw material containing fibers and supplies the raw material to a processing section that processes the raw material, a stopper that blocks transport of a portion of the raw material transported by the transport section; and a controller that controls an operation of the stopper to adjust a supply amount of the raw material to the processing section. Further, it is preferable that the raw material supply device further includes a fixed-amount supply section that intermittently supplies the raw material transported by the transport section to the processing section by a first amount.

9 Claims, 9 Drawing Sheets

RAW MATERIAL SUPPLY DEVICE

The present application is based on, and claims priority from JP Application Serial Number 2020-129623, filed Jul. 30, 2020, the disclosure of which is hereby incorporated by reference herein in its entirety.

BACKGROUND

1. Technical Field

The present disclosure relates to a raw material supply device.

2. Related Art

In recent years, a dry type sheet manufacturing apparatus that uses water as little as possible has been proposed. This sheet manufacturing apparatus includes, for example, a raw material supply section that supplies raw materials such as used paper, and a processing section that performs processing such as defibration, accumulation, and forming on the raw materials supplied by the raw material supply section. Examples of this sheet manufacturing apparatus include those having the configuration shown in JP-A-2019-26969.

The sheet manufacturing apparatus disclosed in JP-A-2019-26969 includes two raw material supply units for transporting raw materials. By alternately driving each raw material supply unit, the raw materials can be stably supplied.

However, in a raw material supply device of JP-A-2019-26969, since two raw material supply units are provided, the size of the device is increased.

SUMMARY

According to an aspect of the present disclosure, there is provided a raw material supply device including: a transport section that transports a raw material containing fibers and supplies the raw material to a processing section that processes the raw material; a stopper that blocks transport of a portion of the raw material transported by the transport section; and a controller that controls an operation of the stopper to adjust a supply amount of the raw material to the processing section.

DESCRIPTION OF EXEMPLARY EMBODIMENTS

Hereinafter, a raw material supply device according to the present disclosure will be described in detail with reference to preferred embodiments shown in the accompanying drawings.

First Embodiment

Figure 1:
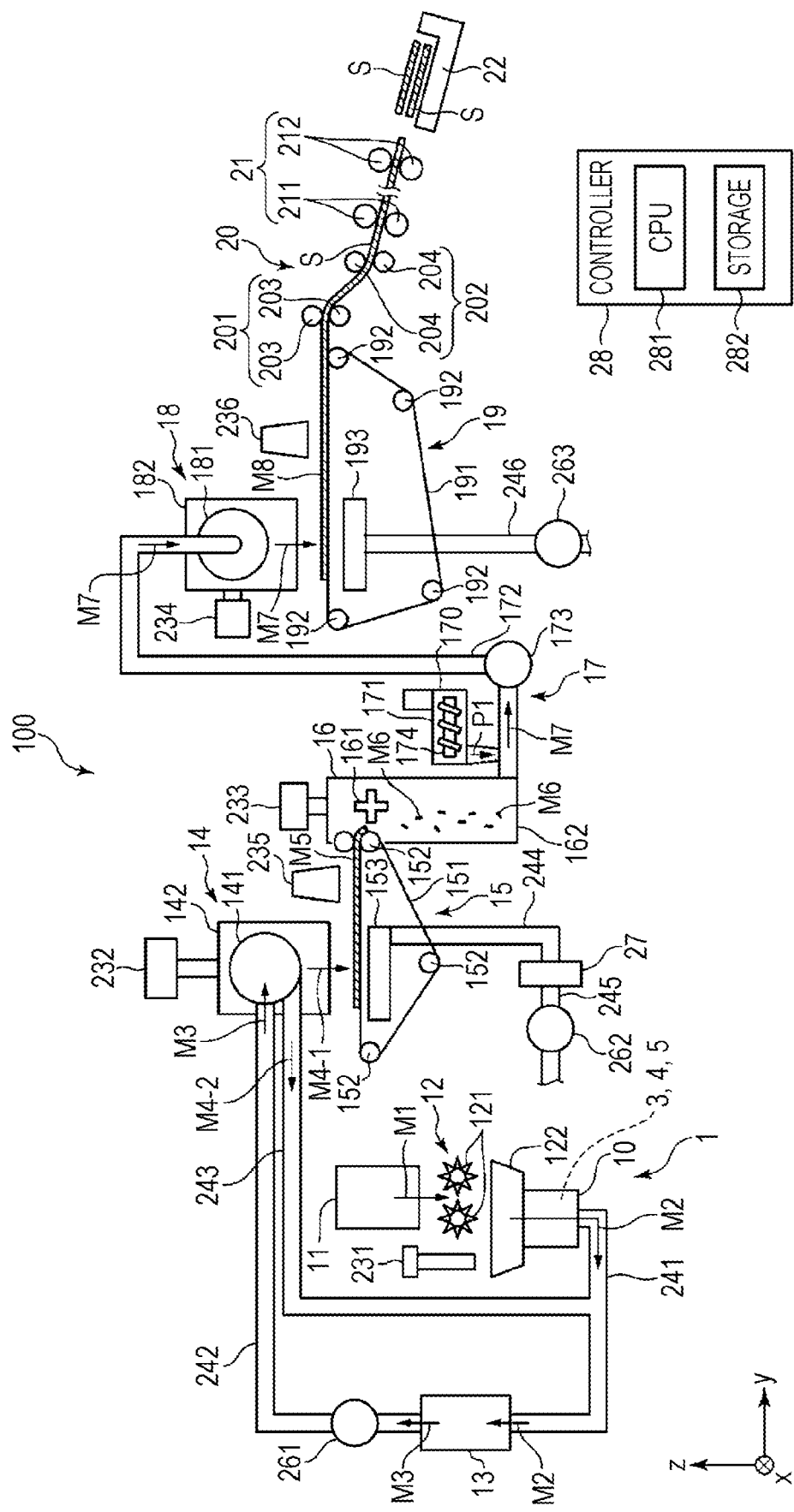
FIG. 1 is a schematic side view showing a fiber structure manufacturing apparatus including a raw material supply device according to a first embodiment.
Figure 2:
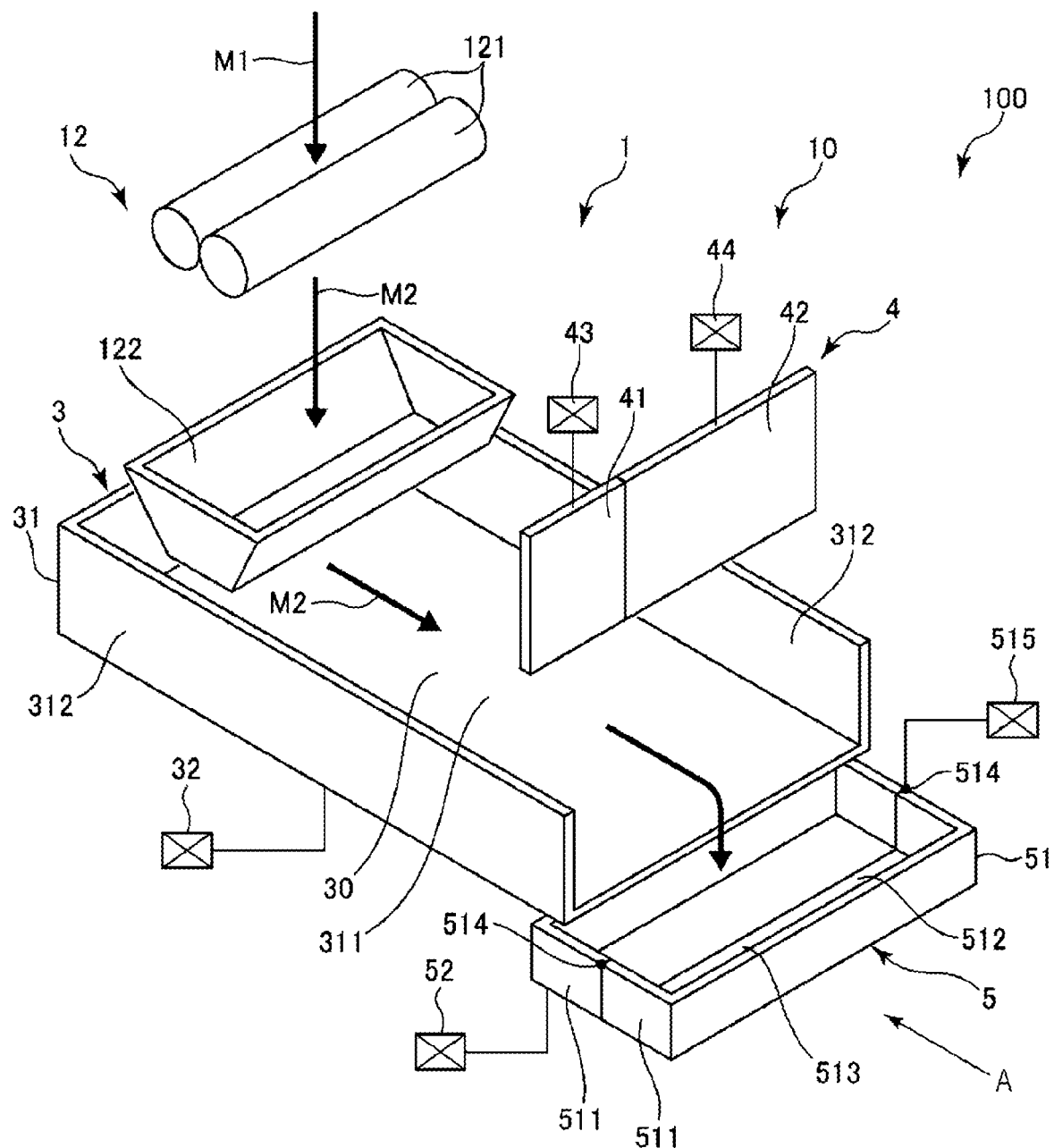
FIG. 2 is a perspective view schematically showing a supply amount adjusting section of the raw material supply device shown in FIG. 1.
Figure 3:
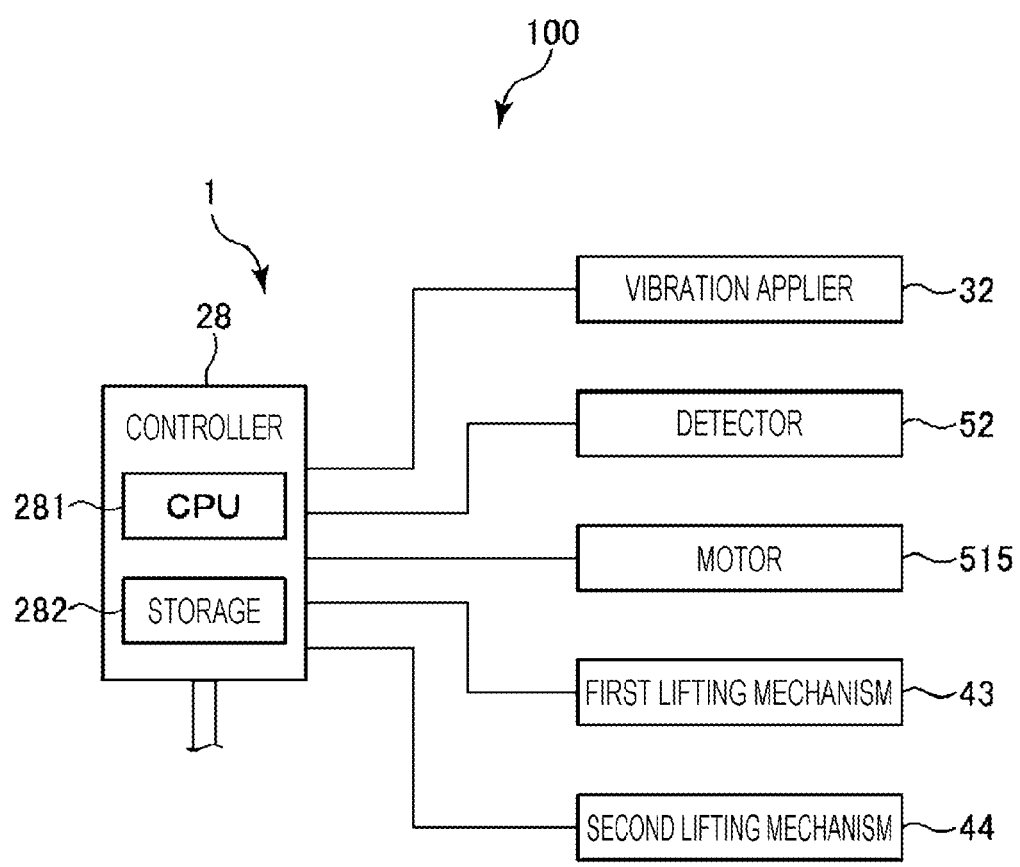
FIG. 3 is a block diagram of the raw material supply device shown in FIG. 1.
Figure 6:
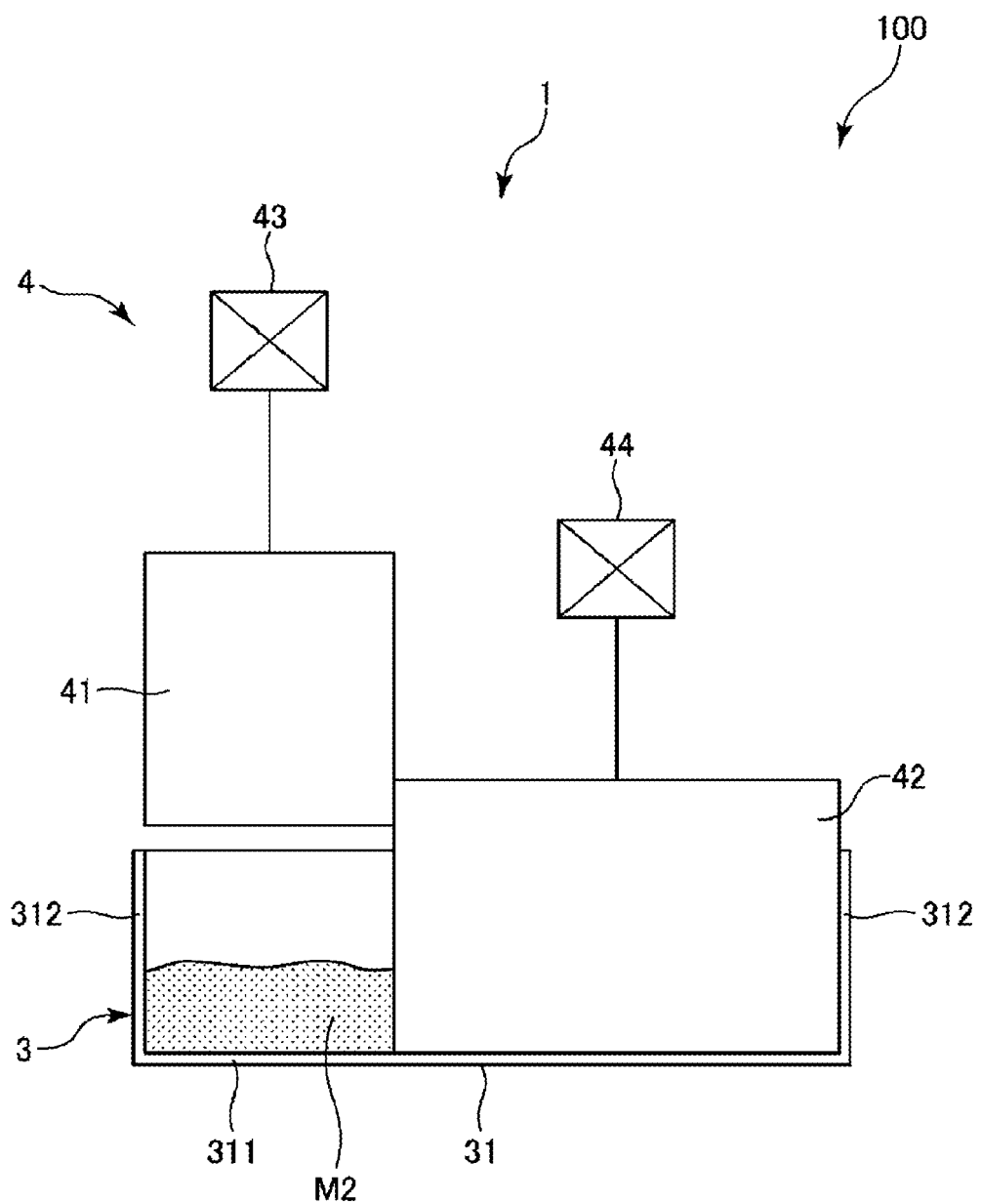
FIG. 6 is a view seen from the direction of arrow A in FIG. 2, and is a view illustrating an operating state of the shutter.
Figure 7:
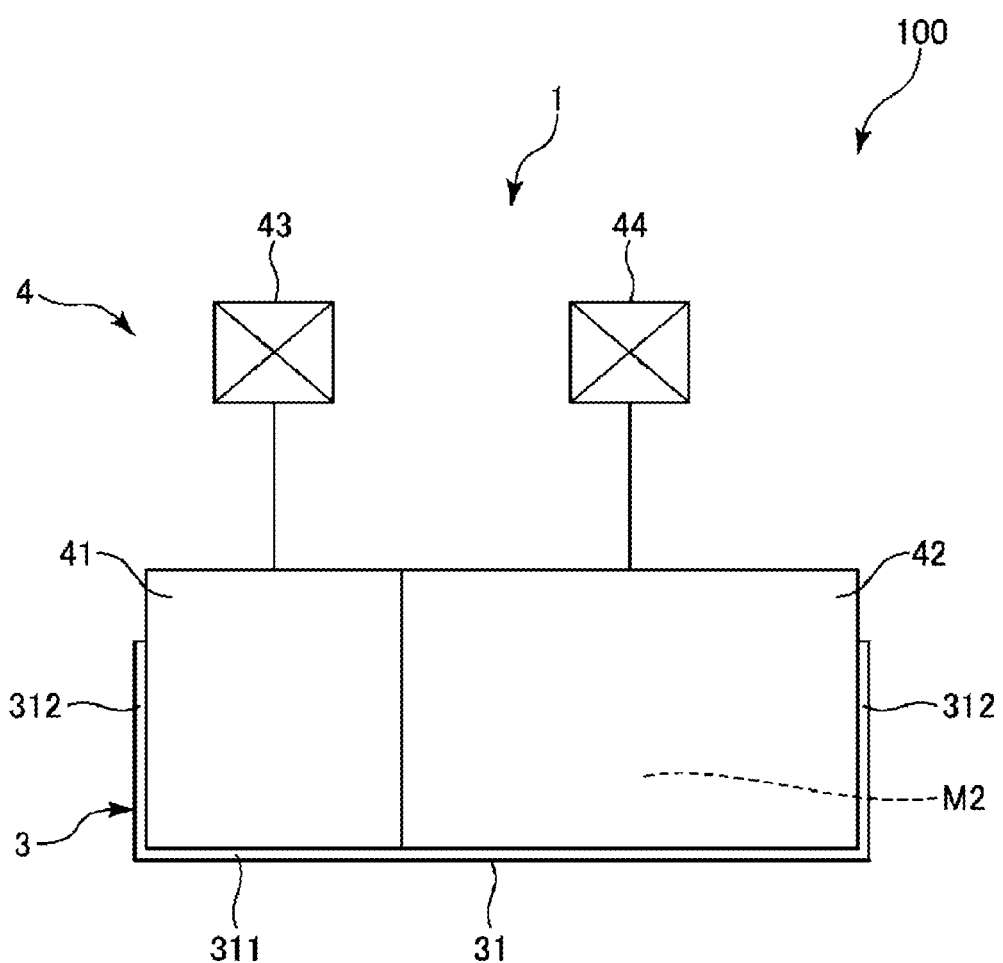
FIG. 7 is a view seen from the direction of arrow A in FIG. 2, and is a view illustrating an operating state of the shutter.
Figure 8:
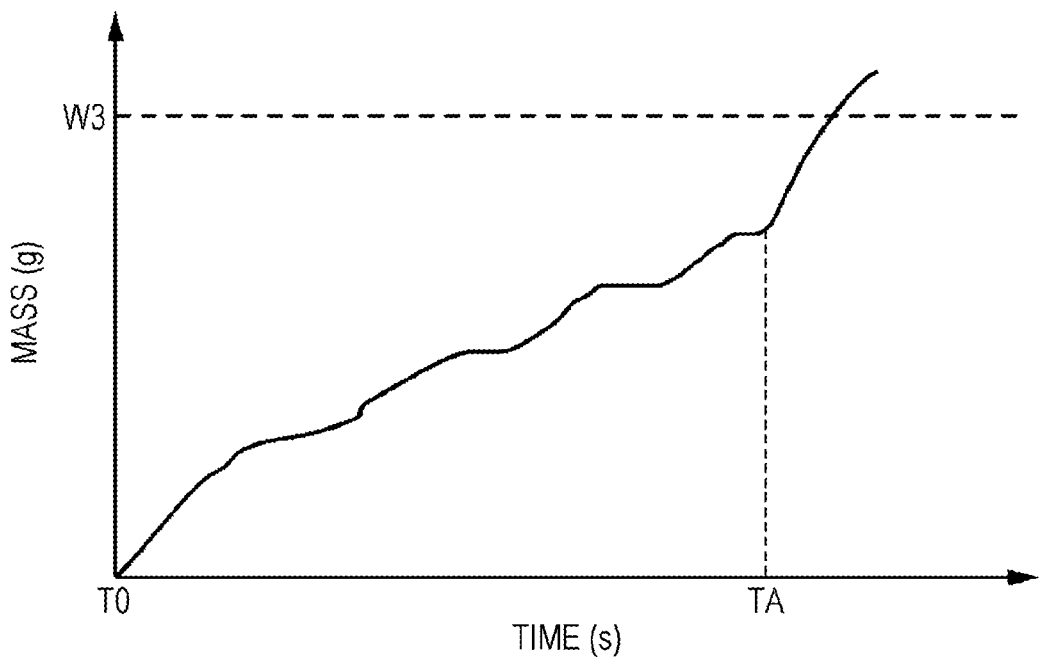
FIG. 8 is a graph showing the weight of a raw material in a storage section of a fixed-amount supply section in the related art over time.
Figure 9:
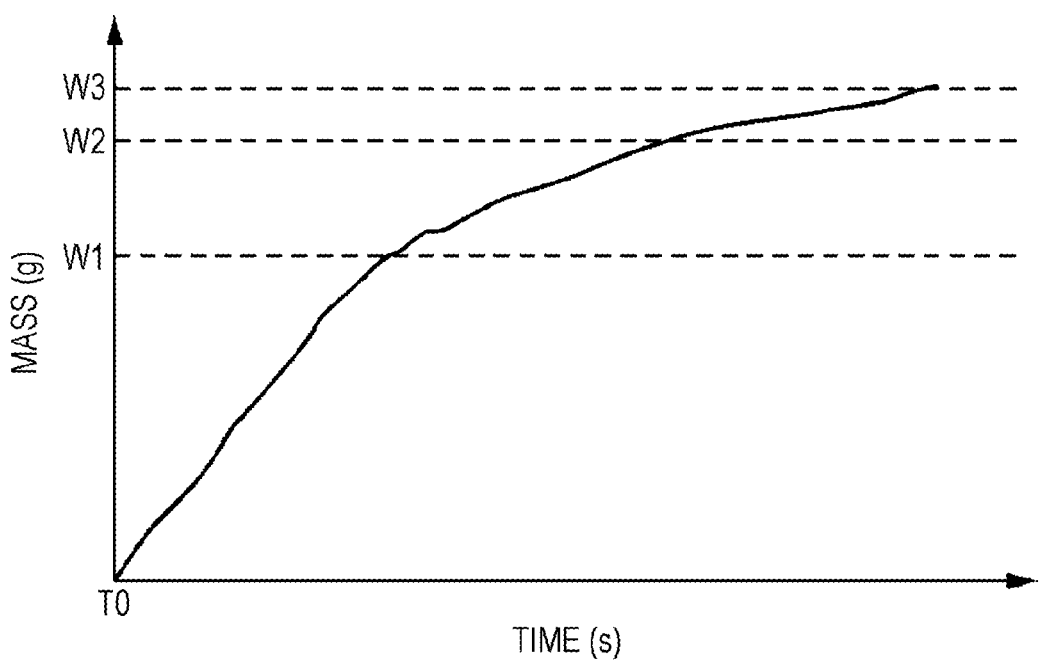
FIG. 9 is a graph showing the weight of a raw material in a storage section of a fixed-amount supply section shown in FIG. 1 over time.
Figure 10:
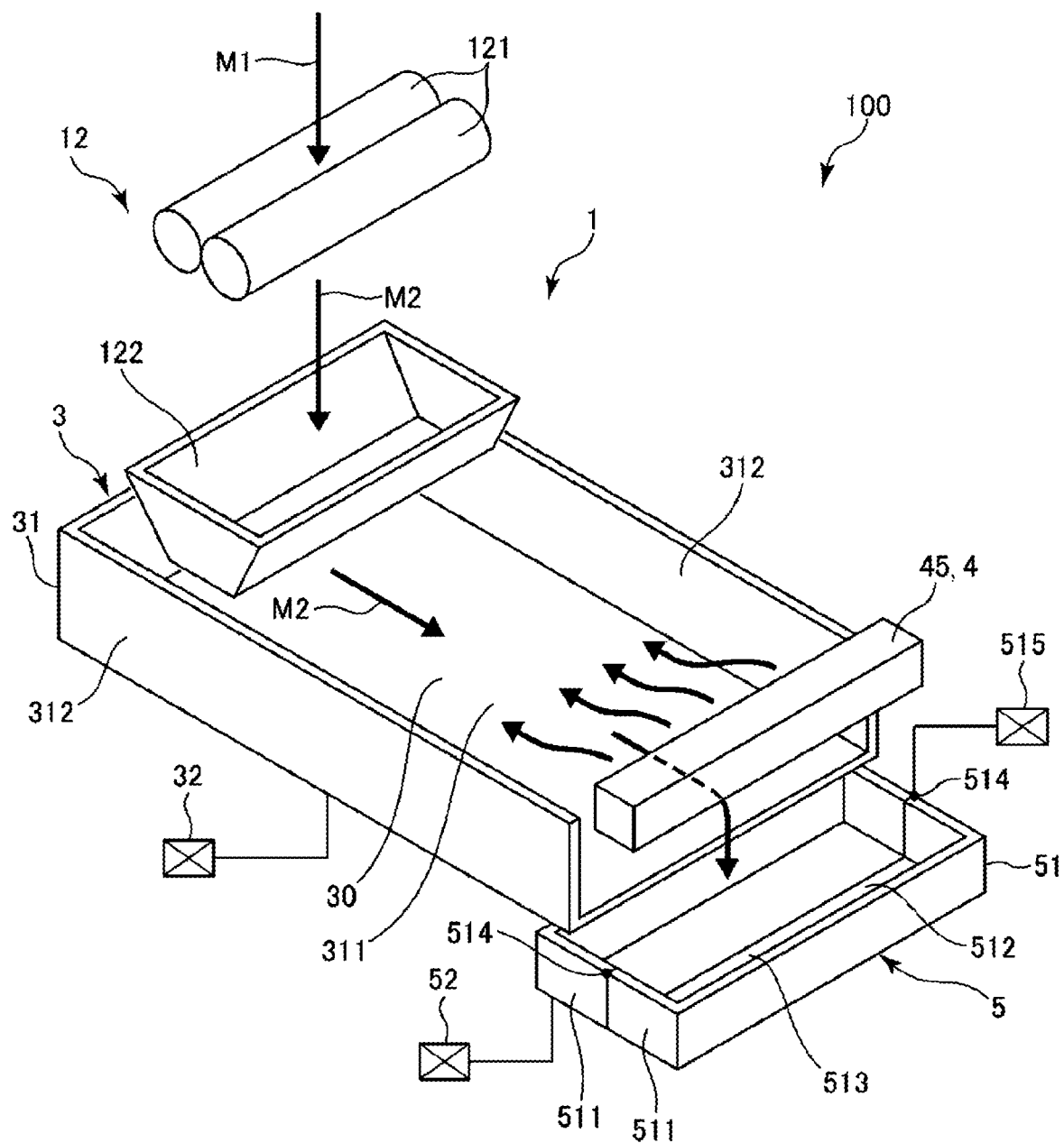
FIG. 10 is a perspective view schematically showing a raw material supply device according to a second embodiment.

FIG. 1 is a schematic side view showing a fiber structure manufacturing apparatus including a raw material supply device according to a first embodiment. FIG. 2 is a perspective view schematically showing a supply amount adjusting section of the raw material supply device shown in FIG. 1. FIG. 3 is a block diagram of the raw material supply device shown in FIG. 1. FIGS. 4 to 7 are views seen from a direction of arrow A in FIG. 2, and are views illustrating operating states of a shutter. FIG. 8 is a graph showing the weight of a raw material in a storage section of a fixed-amount supply section in the related art over time. FIG. 9 is a graph showing the weight of a raw material in a storage section of a fixed-amount supply section shown in FIG. 1 over time. FIG. 10 is a perspective view schematically showing a raw material supply device according to a second embodiment.

In FIGS. 1, 2, and 4 to 7, an upper side may be referred to as "up" or "above", and a lower side may be referred to as "down" or "below".

A fiber structure manufacturing apparatus 100 shown in FIG. 1 is an apparatus for obtaining a formed product by crushing and defibrating a raw material M1, mixing and accumulating a binding material, and forming this accumulated material by a forming section 20.

Further, the formed product manufactured by the fiber structure manufacturing apparatus 100 may have a sheet shape such as recycled paper or a block shape. Further, the density of the formed product is not particularly limited, and a formed product having a relatively high fiber density such as a sheet may be used, a formed product having a relatively low fiber density such as a sponge body may be used, or a formed product in which these characteristics are mixed may be used.

In the following, the raw material M1 will be already used or unnecessary used paper, and a formed product to be manufactured will be described as a sheet S which is recycled paper.

The fiber structure manufacturing apparatus 100 shown in FIG. 1 includes a raw material supply section 11, a crushing section 12, a supply amount adjusting section 10, a defibrating section 13, a selecting section 14, a first web forming section 15, a subdividing section 16, a mixing section 17, a dispersion section 18, a second web forming section 19, a forming section 20, a cutting section 21, a stock section 22, a collection section 27, and a controller 28 that controls the operation of these sections. Of these, the raw material supply section 11, the crushing section 12, the supply amount adjusting section 10, and the controller 28 constitute the raw material supply device 1 of the present disclosure. The raw material supply section 11 and the crushing section 12 may not be components of the raw material supply device 1. In addition, the defibrating section 13 to the stock section 22 constitute a processing section that processes the raw material. In addition, only the defibrating section 13 may constitute a processing section.

Further, the fiber structure manufacturing apparatus 100 includes a humidifying section 231, a humidifying section 232, a humidifying section 233, a humidifying section 234, a humidifying section 235, and a humidifying section 236. In addition, the fiber structure manufacturing apparatus 100 includes a blower 261, a blower 262, and a blower 263.

Further, the humidifying sections 231 to 236 and the blowers 261 to 263 are electrically coupled to the controller 28, and the operation thereof is controlled by the controller 28. That is, in the present embodiment, the operation of each section of the fiber structure manufacturing apparatus 100 is controlled by one controller 28. However, the present disclosure is not limited thereto, and for example, a configuration in which a controller that controls the operation of each section of the raw material supply device 1 and a controller that controls the operation of each section other than the raw material supply device 1 are separately provided may be employed.

Further, in the fiber structure manufacturing apparatus 100, a raw material supply process, a crushing process, a supply amount adjusting process, a defibrating process, a selecting process, a first web forming process, a dividing process, a mixing process, a release process, an accumulation process, a sheet forming process, and a cutting process are executed in this order.

Hereinafter, the configuration of each section will be described.

The raw material supply section 11 performs the raw material supply process that supplies a raw material M1 to the crushing section 12. Examples of the raw material M1 include a sheet-like material made of a fiber-containing material containing a cellulose fiber. The cellulose fiber is not particularly limited as long as it is mainly composed of cellulose as a compound and has a fibrous shape, and the cellulose fiber may contain hemicellulose and lignin in addition to cellulose. Further, the raw material M1 may be in any form such as woven fabric or non-woven fabric. The raw material M1 may be, for example, recycled paper that is recycled and manufactured by defibrating used paper or YUPO paper (registered trademark) that is synthetic paper, or may not be recycled paper.

The crushing section 12 performs a crushing process of crushing the raw material M1 supplied from the raw material supply section 11 in the air such as the atmosphere. The crushing section 12 has a pair of crushing blades 121 and a chute 122.

The pair of crushing blades 121 can rotate in mutually opposite directions to crush the raw material M1 between the crushing blades, that is, cut the raw material to form a crushing piece M2. The shape and size of the crushing piece M2 may be suitable for the defibrating process in the defibrating section 13, are preferably a small piece having a side length of 100 mm or less, and more preferably a small piece having a side length of 70 mm or less, for example.

The chute 122 is disposed below the pair of crushing blades 121 and has, for example, a funnel shape. Thereby, the chute 122 can receive the crushing piece M2 that has been crushed by the crushing blade 121 and has fallen.

Further, the humidifying section 231 is disposed above the chute 122 so as to be adjacent to the pair of crushing blades 121. The humidifying section 231 humidifies the crushing piece M2 in the chute 122. The humidifying section 231 has a filter containing moisture, and includes a vaporization type humidifier that supplies humidified air with increased humidity to the crushing piece M2 by passing air through the filter. By supplying the humidified air to the crushing piece M2, it is possible to prevent the crushing piece M2 from adhering to the chute 122 and the like due to static electricity.

The chute 122 is coupled to the supply amount adjusting section 10. The crushing pieces M2 collected by the chute 122 are quantitatively and intermittently supplied to the defibrating section 13 via a pipe 241 by the supply amount adjusting section 10. The supply amount adjusting section 10 performs a supply amount adjusting process of adjusting the supply amount of the crushing pieces M2. The configuration of the supply amount adjusting section 10 will be described in detail later.

The defibrating section 13 performs a defibrating process of defibrating the crushing piece M2 in the air, that is, in a dry manner. By the defibrating process in the defibrating section 13, a defibrated material M3 can be generated from the crushing piece M2. Here, "defibrating" means unraveling the crushing piece M2 formed by binding a plurality of fibers into individual fibers. Then, the unraveled material becomes the defibrated material M3. The shape of the defibrated material M3 is linear or band shape. Further, the defibrated material M3 may exist in an entangled and lumpy state, that is, in a state of forming a so-called "lump".

In the present embodiment, for example, the defibrating section 13 includes an impeller mill having a rotary blade that rotates at a high speed and a liner that is located on the outer periphery of the rotary blade. The crushing piece M2 flowing into the defibrating section 13 is defibrated by being sandwiched between the rotary blade and the liner.

Further, the defibrating section 13 can generate a flow of air from the crushing section 12 toward the selecting section 14, that is, an air flow, by rotation of the rotary blade. Thereby, it is possible to suck the crushing piece M2 to the defibrating section 13 from the pipe 241. After the defibrating process, the defibrated material M3 can be sent out to the selecting section 14 via the pipe 242.

The blower 261 is installed in the middle of the pipe 242. The blower 261 is an air flow generation device that generates an air flow toward the selecting section 14.

Thereby, the delivery of the defibrated material M3 to the selecting section 14 is promoted.

The selecting section 14 performs the selecting process of selecting the defibrated material M3 according to the length of the fiber. In the selecting section 14, the defibrated material M3 is selected into a first selected material M4-1 and a second selected material M4-2 that is larger than the first selected material M4-1. The first selected material M4-1 has a size suitable for the subsequent manufacture of the sheet S. The average length is preferably 1 μm or more and 30 μm or less. Meanwhile, the second selected material M4-2 includes, for example, one in which defibration is insufficient or one in which the defibrated fibers are excessively aggregated.

The selecting section 14 includes a drum section 141 and a housing 142 that houses the drum section 141.

The drum section 141 is a sieve that is formed of a cylindrical net body and that rotates around its central axis. The defibrated material M3 flows into the drum section 141. As the drum section 141 rotates, the defibrated material M3 smaller than the opening of the net is selected as the first selected material M4-1, and the defibrated material M3 having a size equal to or larger than the opening of the net is selected as the second selected material M4-2.

The first selected material M4-1 falls from the drum section 141.

Meanwhile, the second selected material M4-2 is sent out to a pipe 243 coupled to the drum section 141. The side of the pipe 243 opposite to the drum section 141, that is, the upstream is coupled to the pipe 241. The second selected material M4-2 that has passed through the pipe 243 merges with the crushing piece M2 in the pipe 241 and flows into the defibrating section 13 together with the crushing piece M2. Thereby, the second selected material M4-2 is returned to the defibrating section 13, and defibrated with the crushing piece M2.

Further, the first selected material M4-1 that has fallen from the drum section 141 falls while being dispersed in the air, and travels to the first web forming section 15 located below the drum section 141. The first web forming section 15 performs the first web forming process of forming a first web M5 from the first selected material M4-1. The first web forming section 15 has a mesh belt 151, three tension rollers 152, and a suction section 153.

The mesh belt 151 is an endless belt, and the first selected material M4-1 is accumulated thereon. The mesh belt 151 is wound around three tension rollers 152. When the tension rollers 152 are rotationally driven, the first selected material M4-1 on the mesh belt 151 is transported toward downstream.

The first selected material M4-1 has a size equal to or larger than the opening of the mesh belt 151. Thereby, the first selected material M4-1 is restricted from passing through the mesh belt 151 and can thus be accumulated on the mesh belt 151. Since the first selected material M4-1 is transported toward downstream with the mesh belt 151 in a state where the selected material is accumulated on the mesh belt 151, the selected material is formed as the layered first web M5.

Further, there is a possibility that dust, dirt, and the like are mixed in the first selected material M4-1. Dust or dirt may be generated by crushing or defibration, for example. Such dust or dirt is collected at the collection section 27 which will be described later.

The suction section 153 is a suction mechanism that sucks air from below the mesh belt 151. Thereby, it is possible to suck the dust or dirt which has passed the mesh belt 151 with air.

The suction section 153 is coupled to the collection section 27 via a pipe 244. The dust or dirt sucked by the suction section 153 is collected at the collection section 27.

A pipe 245 is further coupled to the collection section 27. Further, the blower 262 is installed in the middle of the pipe 245. By the operation of the blower 262, a suction force can be generated at the suction section 153. Thereby, the formation of the first web M5 on the mesh belt 151 is promoted. The first web M5 is formed by removing dust, dirt, and the like. Further, the dust or dirt passes through the pipe 244 and reaches the collection section 27 by the operation of the blower 262.

The housing 142 is coupled to the humidifying section 232. The humidifying section 232 includes a vaporization type humidifier. Thereby, the humidified air is supplied into the housing 142. The first selected material M4-1 can be humidified with the humidified air, so that the first selected material M4-1 can be prevented from adhering to the inner wall of the housing 142 due to electrostatic force.

The humidifying section 235 is disposed downstream of the selecting section 14. The humidifying section 235 includes an ultrasonic humidifier that sprays water. Thereby, moisture can be supplied to the first web M5, and thus the content of moisture of the first web M5 is adjusted. By the adjustment, the adsorption of the first web M5 to the mesh belt 151 due to electrostatic force can be prevented. Thereby, the first web M5 is easily peeled from the mesh belt 151 at a position where the mesh belt 151 is folded back by the tension rollers 152.

The subdividing section 16 is disposed downstream of the humidifying section 235. The subdividing section 16 performs the dividing process of dividing the first web M5 peeled from the mesh belt 151. The subdividing section 16 has a propeller 161 that is rotatably supported and a housing 162 that houses the propeller 161. Then, the first web M5 can be divided by the rotating propeller 161. The divided first web M5 becomes a subdivided body M6. Further, the subdivided body M6 descends in the housing 162.

The housing 162 is coupled to the humidifying section 233. The humidifying section 233 includes a vaporization type humidifier. Thereby, the humidified air is supplied into the housing 162. The humidified air can prevent the subdivided body M6 from adhering to the propeller 161 or the inner wall of the housing 162 due to electrostatic force.

The mixing section 17 is disposed downstream of the subdividing section 16. The mixing section 17 performs the mixing process of mixing the subdivided body M6 and an additive. The mixing section 17 has an additive supply section 171, a pipe 172, and a blower 173.

The pipe 172 couples the housing 162 of the subdividing section 16 and a housing 182 of the dispersion section 18 to each other and is a flow path through which a mixture M7 of the subdivided body M6 and the additive passes.

The additive supply section 171 is coupled in the middle of the pipe 172. The additive supply section 171 has a housing 170 in which the additive is housed and a screw feeder 174 provided in the housing 170. The additive in the housing 170 is extruded from the housing 170 and supplied into the pipe 172 by rotation of the screw feeder 174. The additive supplied to the pipe 172 is mixed with the subdivided body M6 to become the mixture M7.

Here, examples of the additive supplied from the additive supply section 171 include a binder for binding fibers, a colorant for coloring the fiber, an aggregation inhibitor for inhibiting aggregation of the fiber, a flame retardant for making the fiber difficult to burn, a paper strengthening agent for enhancing the paper strength of sheet S, a defibrated material, and the like, and one or more of these can be used in combination. Hereinafter, the case where the additive is a resin P1 as a binder will be described as an example. The additive includes a binder that binds the fibers to each other, so that the strength of the sheet S can be increased.

As the resin P1, powder or particulate material can be used. Further, as the resin P1, for example, a thermoplastic resin, a curable resin, or the like can be used, but a thermoplastic resin is desirably used. Examples of the thermoplastic resin include an AS resin, an ABS resin, polyolefin such as polyethylene, polypropylene, or an ethylene-vinyl acetate copolymer, modified polyolefin, an acrylic resin such as polymethyl methacrylate, polyvinyl chloride, polystyrene, polyester such as polyethylene terephthalate and polybutylene terephthalate, polyamide such as nylon 6, nylon 46, nylon 66, nylon 610, nylon 612, nylon 11, nylon 12, nylon 6-12, and nylon 6-66, polyphenylene ether, polyacetal, polyether, polyphenylene oxide, polyetheretherketone, polycarbonate, polyphenylene sulfide, thermoplastic polyimide, polyetherimide, a liquid crystal polymer such as aromatic polyester, various thermoplastic elastomers such as a styrene-based thermoplastic elastomer, a polyolefin-based thermoplastic elastomer, a polyvinyl chloride-based thermoplastic elastomer, a polyurethane-based thermoplastic elastomer, a polyester-based thermoplastic elastomer, a polyamide-based thermoplastic elastomer, a polybutadiene-based thermoplastic elastomer, a trans polyisoprene-based thermoplastic elastomer, a fluoro rubber-based thermoplastic elastomer, and a chlorinated polyethylene-based thermoplastic elastomer, and the like, and one or more selected from these can be used in combination. As the thermoplastic resin, polyester or a composition containing the polyester is preferably used.

In the middle of the pipe 172, the blower 173 is installed downstream of the additive supply section 171. The mixing of the subdivided body M6 and the resin P1 is promoted by the action of a rotating portion such as a blade of the blower 173. Further, the blower 173 can generate an air flow toward the dispersion section 18. With the air flow, the subdivided body M6 and the resin P1 can be stirred in the pipe 172. Thereby, the mixture M7 is transported to the dispersion section 18 in a state where the subdivided body M6 and the resin P1 are uniformly dispersed. Further, the subdivided body M7 in the mixture M7 is loosened in the process of passing through the pipe 172, and has a finer fibrous shape.

The dispersion section 18 performs the release process of loosening and releasing the mutually entangled fibers in the mixture M7. The dispersion section 18 has a drum 181 for introducing and releasing the mixture M7 which is a defibrated material, and a housing 182 for housing the drum 181.

The drum 181 is a sieve that is formed of a cylindrical net body and that rotates around its central axis. For example, introduction ports (not shown) are formed on both end surfaces of the drum 181, and the mixture M7 is introduced into each introduction port. When the drum 181 rotates, fibers or the like smaller than the opening of the net in the mixture M7 can pass through the drum 181. At that time, the mixture M7 is loosened and released. That is, the net opening of the drum 181 functions as an opening for releasing the material containing the fiber.

Further, the housing 182 is coupled to the humidifying section 234. The humidifying section 234 includes a vaporization type humidifier. Thereby, the humidified air is supplied into the housing 182. The inside of the housing 182 can be humidified with the humidified air, so that the mixture M7 can be prevented from adhering to the inner wall of the housing 182 due to electrostatic force.

Further, the mixture M7 released by the drum 181 falls while being dispersed in the air, and travels to the second web forming section 19 located below the drum 181. The second web forming section 19 performs the accumulation process of accumulating the mixture M7 to form the second web M8 which is an accumulated material. The second web forming section 19 has a mesh belt 191, tension rollers 192, and a suction section 193.

The mesh belt 191 is a mesh member, and in the illustrated configuration, it is composed of an endless belt. Further, the mixture M7 dispersed and released by the dispersion section 18 is accumulated on the mesh belt 191. The mesh belt 191 is wound around four tension rollers 192. When the tension rollers 192 are rotationally driven, the mixture M7 on the mesh belt 191 is transported toward downstream.

Further, most of the mixture M7 on the mesh belt 191 has a size equal to or larger than the opening of the mesh belt 191. Thereby, the mixture M7 is restricted from passing through the mesh belt 191 and can thus be accumulated on the mesh belt 191. Since the mixture M7 is transported toward downstream with the mesh belt 191 in a state where the mixture is accumulated on the mesh belt 191, the mixture is formed as the layered second web M8.

The suction section 193 is a suction mechanism that sucks air from below the mesh belt 191. Thereby, the mixture M7 can be sucked onto the mesh belt 191, and thus the accumulation of the mixture M7 onto the mesh belt 191 is promoted.

A pipe 246 is coupled to the suction section 193. Further, the blower 263 is installed in the middle of the pipe 246. By the operation of the blower 263, a suction force can be generated at the suction section 193.

The humidifying section 236 is disposed downstream of the dispersion section 18. The humidifying section 236 includes an ultrasonic humidifier similar to the humidifying section 235. Thereby, moisture can be supplied to the second web M8, and thus the content of moisture of the second web M8 is adjusted. By the adjustment, the adsorption of the second web M8 to the mesh belt 191 due to electrostatic force can be prevented. Thereby, the second web M8 is easily peeled from the mesh belt 191 at a position where the mesh belt 191 is folded back by the tension rollers 192.

The total content of moisture added from the humidifying section 231 to the humidifying section 236 is preferably 0.5 parts by mass or more and 20 parts by mass or less with respect to 100 parts by mass of the material before humidification, for example.

The forming section 20 is disposed downstream of the second web forming section 19. The forming section 20 performs the sheet forming process of forming the sheet S from the second web M8. The forming section 20 has a pressurizing section 201 and a heating section 202.

The pressurizing section 201 has a pair of calender rollers 203 and can pressurize the second web M8 between the calender rollers 203 without heating the second web M8. Thereby, the density of the second web M8 is increased. As the degree of the heating in the case of heating, for example, it is preferable that the resin P1 is not melted. The second web M8 is transported toward the heating section 202. Note that, one of the pair of calender rollers 203 is a main driving roller which is driven by the operation of a motor (not shown), and the other is a driven roller.

The heating section 202 has a pair of heating rollers 204 and can pressurize the second web M8 between the heating rollers 204 while heating the second web M8. By the heating and pressurizing, the resin P1 is melted in the second web M8, and the fibers are bound to each other via the melted resin P1. Thereby, the sheet S is formed. The sheet S is transported toward the cutting section 21. Note that, one of the pair of heating rollers 204 is a main driving roller which is driven by the operation of a motor (not shown), and the other is a driven roller.

The cutting section 21 is disposed downstream of the forming section 20. The cutting section 21 performs the cutting process of cutting the sheet S. The cutting section 21 has a first cutter 211 and a second cutter 212.

The first cutter 211 cuts the sheet S in a direction that intersects with the transport direction of the sheet S, particularly in a direction orthogonal thereto.

The second cutter 212 cuts the sheet S in a direction parallel to the transport direction of the sheet S on the downstream of the first cutter 211. The cutting is a process of removing unnecessary portions at both end portions of the sheet S, that is, the end portions in the +y axis direction and the −y axis direction to adjust the width of the sheet S. In addition, the portion that has been removed by the cutting is referred to as a so-called "edge".

By cutting the first cutter 211 and the second cutter 212 as described above, the sheet S having a desired shape and size can be obtained. The sheet S is transported further downstream and accumulated in the stock section 22.

The forming section 20 is not limited to the configuration of forming into the sheet S as described above, and may have a configuration of forming into, for example, a block-shaped or spherical formed product.

Each section included in the fiber structure manufacturing apparatus 100 is electrically coupled to the controller 28. The operations of these sections are controlled by the controller 28.

The controller 28 has a central processing unit (CPU) 281 and a storage 282. The CPU 281 can execute various programs stored in the storage 282, and can, for example, make various determinations, various commands, and the like.

The storage 282 stores various programs, such as a program for manufacturing the sheet S, various calibration curves, a table, and the like.

The controller 28 may be built in the fiber structure manufacturing apparatus 100 or may be provided in an external device such as an external computer. In some cases, the external device communicates with the fiber structure manufacturing apparatus 100 via a cable or the like, or wirelessly communicates therewith. For example, the external device is coupled to the fiber structure manufacturing apparatus 100 via a network such as the Internet.

Further, for example, the CPU 281 and the storage 282 may be integrated as a single unit, the CPU 281 may be built in the fiber structure manufacturing apparatus 100 and the storage 282 may be provided in an external device such as an external computer, or the storage 282 may be built in the fiber structure manufacturing apparatus 100 and the CPU 281 may be provided in an external device such as an external computer.

Next, the configuration of the supply amount adjusting section 10 will be described.

As shown in FIGS. 1 and 2, the supply amount adjusting section 10 includes a transport section 3, a stopper 4, and a fixed-amount supply section 5. In the following, a state where the transport amount of the crushing pieces M2 by the stopper 4 is reduced may be simply referred to as a "state where the stopper is operating".

The transport section 3 transports the crushing piece M2 which is a raw material containing fibers, and supplies the crushing piece to the defibrating section 13 which is a processing section that processes the crushing piece M2. The transport section 3 includes a transport lane 31 and a vibration applier 32 that applies vibration to the transport lane 31.

The transport lane 31 has a tray shape having a bottom plate portion 311 and a pair of side wall portions 312 erected from the bottom plate portion 311. The bottom plate portion 311 has a long shape, and in the present embodiment, it is composed of a rectangular plate-like body. The crushing pieces M2 can be accumulated on the bottom plate portion 311. The longitudinal direction of the bottom plate portion 311 is the transport direction in which the crushing piece M2 is transported.

The side wall portion 312 is a plate-like body erected from the edge portion of the long side of the bottom plate portion 311. Thereby, it is possible to prevent the crushing pieces M2 accumulated on the bottom plate portion 311 from protruding, and thus the crushing pieces M2 can be stably transported. Further, the portion surrounded by the bottom plate portion 311 and the pair of side wall portions 312 serves as a transport path 30 for transporting the crushing piece M2.

The vibration applier 32 is coupled to the transport lane 31 and applies vibration to the transport lane 31. By vibrating the transport lane 31, the crushing piece M2 on the bottom plate portion 311 can be stably transported. Thereby, for example, the configuration of the transport section 3 can be simplified as compared with the configuration of belt transport.

The vibration applier 32 is not particularly limited, and for example, a configuration in which vibration is generated by passing an electric current through a conducting wire that crosses the magnetic field, and the vibrator is vibrated by an exciting force thereof, or a configuration in which a coil is used and an electric current is passed through the coil to cause vibration by an exciting force of an electromagnet may be used. As shown in FIG. 3, the vibration applier 32 is electrically coupled to the controller 28, and the operation thereof is controlled by the controller 28. Further, the controller 28 can adjust the degree of vibration applied by the vibration applier 32 by adjusting the energization condition of the vibration applier 32. Thereby, the transport speed and the transport amount of the crushing pieces M2 can be adjusted.

As described above, the transport section 3 vibrates and transports the crushing piece M2 by the vibration applier 32, but the present disclosure is not limited thereto, and for example, the crushing piece M2 may be transported by a belt, the crushing piece M2 may be slid on an inclined surface, or the crushing piece M2 may be transported by an air flow.

As shown in FIGS. 2 and 4 to 7, the stopper 4 includes a first shielding plate 41, a second shielding plate 42, a first lifting mechanism 43 that moves the first shielding plate 41 up and down, and a second lifting mechanism 44 that moves the second shielding plate 42 up and down.

The first shielding plate 41 and the second shielding plate 42 are installed above the bottom plate portion 311 so that the thickness direction thereof is in the transport direction of the crushing piece M2. Further, the first shielding plate 41 and the second shielding plate 42 are arranged side by side in a direction intersecting the transport direction of the crushing piece M2, for example, an orthogonal direction. Further, when viewed from the downstream in the transport direction of the crushing piece M2, the first shielding plate 41 is located on the left side, and the second shielding plate 42 is located on the right side.

Further, the size of the first shielding plate 41 in plan view and the size of the second shielding plate 42 in plan view are different from each other. In the present embodiment, the size of the first shielding plate 41 in plan view is smaller than the size of the second shielding plate 42 in plan view.

Figure 4:
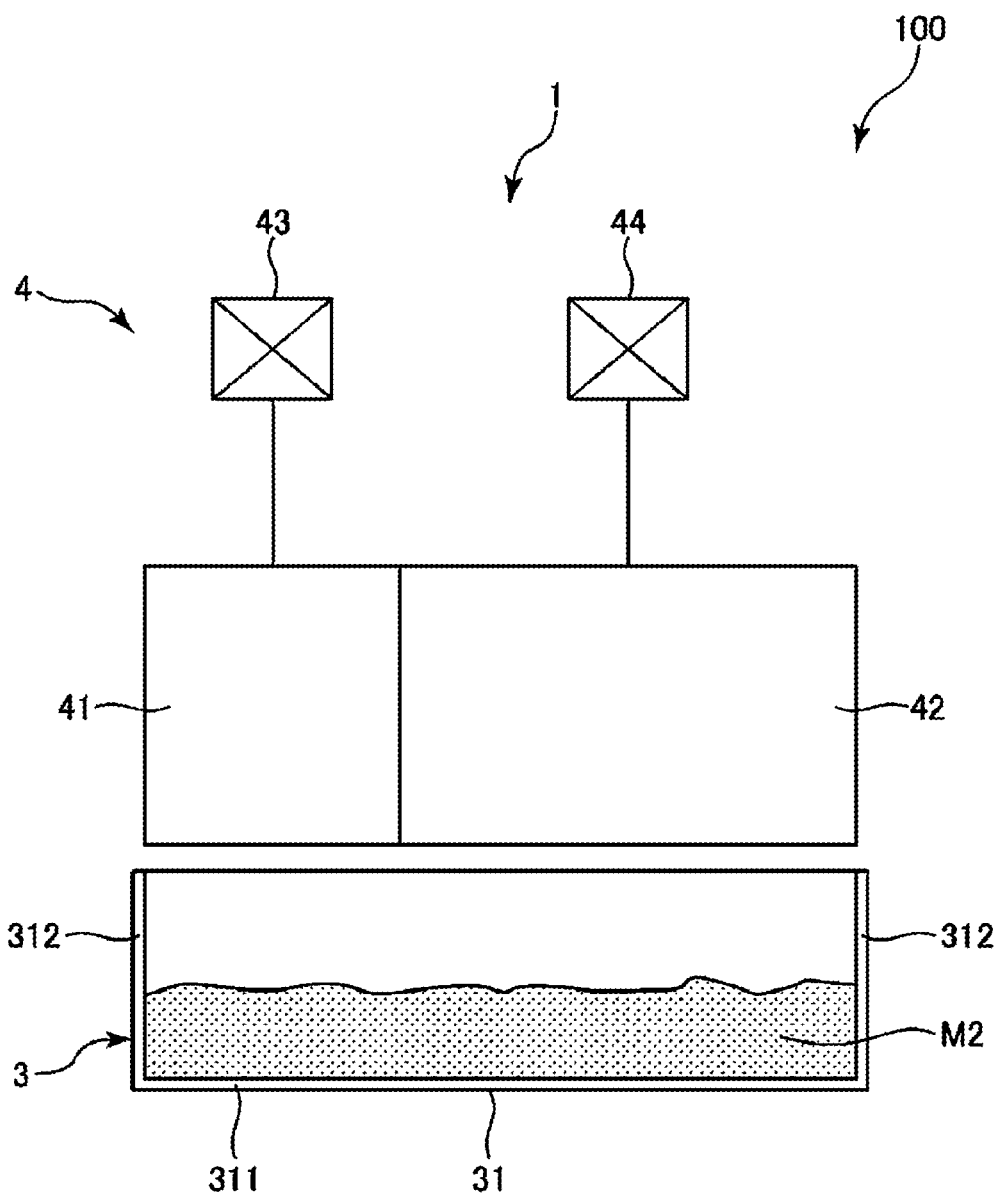
FIG. 4 is a view seen from a direction of arrow A in FIG. 2, and is a view illustrating an operating state of a shutter.
Figure 5:
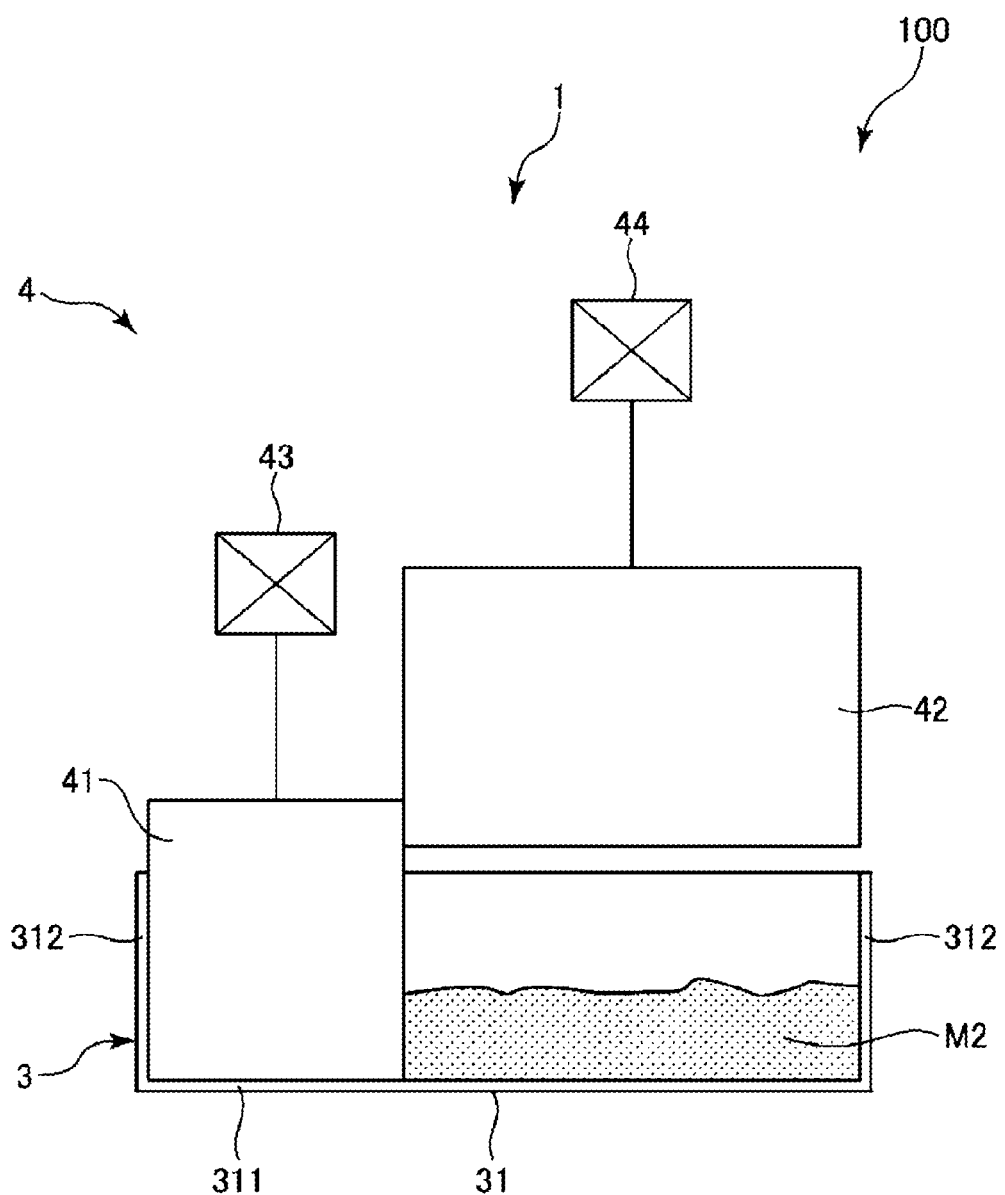
FIG. 5 is a view seen from the direction of arrow A in FIG. 2, and is a view illustrating an operating state of the shutter.

The first lifting mechanism 43 raises and lowers the first shielding plate 41, and the second lifting mechanism 44 raises and lowers the second shielding plate 42. Therefore, the first lifting mechanism 43 may take a state where the first shielding plate 41 is lowered to block a portion of the transport path 30 and block the crushing piece M2, as shown in FIGS. 5 and 7, and a state where the first shielding plate 41 is raised to not block the crushing piece M2, as shown in FIGS. 4 and 6. Further, the second lifting mechanism 44 may take a state where the second shielding plate 42 is lowered to block a portion of the transport path 30 and block the crushing piece M2, as shown in FIGS. 6 and 7, and a state where the second shielding plate 42 is raised to not block the crushing piece M2, as shown in FIGS. 4 and 5.

The first lifting mechanism 43 and the second lifting mechanism 44 are composed of, for example, a motor that is operated by energization. Further, as shown in FIG. 3, the first lifting mechanism 43 and the second lifting mechanism 44 are each electrically coupled to the controller 28, and are controlled independently of each other by the controller 28. This control pattern will be described in detail later.

As shown in FIG. 2, the fixed-amount supply section 5 has a function of supplying the crushing piece M2 transported by the transport section 3 and fallen from the transport lane 31 to the defibrating section 13.

The fixed-amount supply section 5 includes a storage section 51 that stores the crushing piece M2, and a detector 52 that is stored in the storage section 51 and detects the amount of the crushing pieces M2. As the detector 52, for example, a load converter generally called a "load cell" that converts the weight of the crushing piece M2 into an electric signal can be used. The detector 52 is disposed inside the storage section 51. Thereby, the total weight of the crushing pieces M2 in the storage section 51, that is, the weight of the crushing pieces M2 can be accurately measured without being affected by the weight of the storage section 51.

Further, as shown in FIG. 3, the detector 52 is electrically coupled to the controller 28, and an electric signal indicating the weight of the crushing piece M2 is transmitted to the controller 28.

In the present embodiment, a configuration for detecting the weight has been described as an example of a detector for detecting the amount of the crushing pieces M2, but the present disclosure is not limited thereto, and an optical sensor for detecting the volume, a capacitance sensor, or the like may be used.

The storage section 51 is composed of two split half bodies 511 that can be divided and separated, and is formed in a box shape in a state where these two split half bodies 511 are assembled. Then, the storage section 51 has an introduction port 512 in which the crushing piece M2 is introduced in a box-shaped state above the storage section 51.

Further, the storage section 51 has a bottom portion 513 that can be opened and closed by approaching and separating the split half bodies 511 from each other. In the illustrated configuration, the split half body 511 can be opened and closed by rotating via a rotation support portion 514. The storage section 51 stores the crushing piece M2 when the bottom portion 513 is in the closed state, and discharges the crushing piece M2 when the bottom portion 513 is in the open state, although not shown. The crushing piece M2 discharged from the storage section 51 can flow into the pipe 241 shown in FIG. 1 and flow down toward the downstream. After that, the crushing piece M2 is used as a raw material for the sheet S as described above.

Further, the rotation support portion 514 is coupled to a motor 515, and the split half bodies 511 open and close each other by the rotational force of the motor 515. The operation of the motor 515 is controlled by the controller 28.

In such a raw material supply device 1, when the crushing piece M2 transported by the transport section 3 is stored in the storage section 51 and the stored amount reaches a third threshold W3 which is a preset first amount, the crushing piece M2 is supplied to the defibrating section 13 with the bottom portion 513 open. Then, the crushing piece M2 is stored again with the split half body 511 closed. By repeating such an operation, the crushing piece M2 can be quantitatively and intermittently supplied to the defibrating section 13.

As described above, the raw material supply device 1 includes the fixed-amount supply section 5 that intermittently supplies the crushing piece M2 which is the raw material transported by the transport section 3 to the defibrating section 13 which is the processing section by the third threshold W3 which is a first amount. Thereby, the uniformity such as the density of the sheet S can be improved.

Further, the fixed-amount supply section 5 includes the storage section 51 which is a receiving portion that receives the crushing piece M2 which is the raw material transported by the transport section 3 and the detector 52 that detects an amount of the crushing piece M2 in the storage section 51. Thereby, better quantitativeness can be ensured.

Here, the crushing pieces M2 may form lumps depending on various conditions such as the amount of the crushing pieces M2 to be transported, the material of the crushing pieces M2, and the size of the crushing pieces M2. In this case, the following defect may occur. FIG. 8 is a graph showing the weight of a crushing piece M2 in a storage section 51 in a raw material supply device in the related art over time. At time T0, the crushing piece M2 has not yet been stored. After that, the weight of the crushing piece M2 increases with the passage of time. Then, for example, at time TA, a third threshold W3 which is a first amount is approaching. The third threshold W3 is a target amount to be quantitatively supplied.

At this time, since the lumps of the crushing pieces M2 have entered the storage section 51, the weight of the crushing pieces M2 in the storage section 51 increases sharply and greatly exceeds the third threshold W3. In this case, a larger amount of the crushing pieces M2 than the third threshold W3 is supplied to a defibrating section 13. As a result, the quantitativeness is impaired. According to the present disclosure, such a defect can be prevented by a simple device configuration. This will be described below.

In the raw material supply device 1, the controller 28 controls the stopper 4 so as to be in the following first state, second state, third state, and fourth state.

First, in the state where the crushing piece M2 is not stored in the storage section 51, the first state is set. The first state is a state where the first shielding plate 41 and the second shielding plate 42 are raised, that is, they do not block the transport path 30, as shown in FIG. 4. In this first state, the amount of the crushing pieces M2 transported is the largest among the first to fourth states.

In the first state, when the amount of the crushing pieces M2 in the storage section 51 increases and exceeds a first threshold W1 as shown in FIG. 9, the second state is set. The second state is a state where the first shielding plate 41 is lowered and the second shielding plate 42 is raised, that is, only the first shielding plate 41 blocks the transport path 30, as shown in FIG. 5. In this second state, the amount of the crushing pieces M2 transported is the second largest after the first state.

In the second state, when the amount of the crushing pieces M2 in the storage section 51 increases and exceeds a second threshold W2 as shown in FIG. 9, the third state is set. The third state is a state where the second shielding plate 42 is lowered and the first shielding plate 41 is raised, that is, only the second shielding plate 42 blocks the transport path 30, as shown in FIG. 6. In this third state, the amount of the crushing pieces M2 transported is smaller than that in the second state.

In the third state, when the amount of the crushing pieces M2 in the storage section 51 increases and reaches the third threshold W3 as shown in FIG. 9, the fourth state is set. The fourth state is a state where the first shielding plate 41 and the second shielding plate 42 are lowered, and the first shielding plate 41 and the second shielding plate 42 block the transport path 30, as shown in FIG. 7. In this state, the supply of the crushing piece M2 from the transport path 30 to the storage section 51 is stopped. Then, in this fourth state, by operating the motor 515 to open the bottom portion 513 of the storage section 51, a predetermined amount can be supplied to the defibrating section 13. After that, the first shielding plate 41 and the second shielding plate 42 are raised again to transition to the above-mentioned first state, and the supply of the crushing pieces M2 on the transport lane 31 is restarted.

As described above, in the raw material supply device 1, as the amount of the crushing pieces M2 in the storage section 51 increases, the operation of the stopper 4 causes the amount of the crushing piece M2 transported by the transport section 3, that is, the amount supplied to the fixed-amount supply section 5 to be reduced. In other words, when the amount of the crushing pieces M2 in the storage section 51 approaches a predetermined amount which is the third threshold W3, the amount of the crushing piece M2 transported by the transport section 3, that is, the amount supplied to the fixed-amount supply section 5 is reduced. Thereby, even if the amount of the crushing pieces M2 in the storage section 51 is supplied to the storage section 51 together with the lumps of the crushing pieces M2 in a state close to the third threshold W3, it is possible to prevent or suppress the amount of the crushing pieces M2 in the storage section 51 from significantly exceeding the third threshold W3. Therefore, the quantitativeness can be ensured. Further, in the related art, the configuration has two transport paths for adjusting the supply amount of the crushing pieces M2 to the storage section 51, but in the present disclosure, since adjustment can be performed while transporting through one transport path 30, the miniaturization of the device can be achieved. From the above, it is possible to ensure the quantitativeness while achieving the miniaturization of the device.

The transport amount of the crushing piece M2 may be controlled by changing the operating conditions of the vibration applier 32 in addition to the operation of the stopper 4 in each state as described above. Thereby, the quantitativeness can be ensured more reliably. An example of a preferable magnitude of vibration intensity applied to the transport lane 31 by the vibration applier 32 in each state will be specifically described.

In the first state, since the amount of the crushing pieces M2 in the storage section 51 is sufficiently smaller than the predetermined amount of the third threshold W3, it is preferable that a large amount of the crushing pieces M2 is supplied to the storage section 51 at high speed. Therefore, it is preferable that the vibration intensity applied by the vibration applier 32 is set to be large within the settable range. Thereby, the supply efficiency of the crushing piece M2 is excellent.

In the second state, since the amount of the crushing pieces M2 in the storage section 51 exceeds the first threshold W1, it is preferable that the supply amount of the crushing pieces M2 is gradually reduced toward the predetermined amount of the third threshold W3. Therefore, it is preferable that the vibration intensity applied by the vibration applier 32 is set to be smaller than the vibration intensity in the first state. Further, the vibration intensity may be set to gradually decrease as the amount of the crushing pieces M2 in the storage section 51 approaches the second threshold W2 toward the third state which will be described later.

In the third state, the amount of the crushing pieces M2 in the storage section 51 is close to the predetermined amount of the third threshold W3. Therefore, it is preferable that the vibration intensity applied by the vibration applier 32 is set to be smaller than the vibration intensity in the second state. Thereby, the crushing pieces M2 can be transported little by little, and the quantitativeness of the crushing pieces M2 accumulated in the fixed-amount supply section 5 can be ensured.

In the fourth state, the first shielding plate 41 and the second shielding plate 42 are lowered, but even in this state, it is preferable that vibration is applied to the transport lane 31 by the vibration applier 32, and the crushing piece M2 is transported. Thereby, the crushing pieces M2 on the transport lane 31 are blocked by the first shielding plate 41 and the second shielding plate 42, and are accumulated on the downstream of the transport lane 31. Therefore, when the fixed-amount supply section 5 supplies a predetermined amount of crushing pieces M2 to the defibrating section 13 and then raises the first shielding plate 41 and the second shielding plate 42 to transition to the first state again, the crushing pieces M2 accumulated on the downstream of the transport lane 31 fall into the storage section 51 at once. Thereby, the supply rate of the crushing pieces M2 after the transition to the first state is improved. Further, it is preferable that the vibration intensity applied by the vibration applier 32 in the fourth state is set to be larger than the vibration intensity in the third state. Thereby, the amount of crushing pieces M2 accumulated on the transport lane 31 can be increased, and the above-mentioned effect becomes remarkable.

As described above, the raw material supply device 1 includes a transport section 3 that transports a crushing piece M2 which is a raw material containing fibers and supplies the crushing piece to a defibrating section 13 which is a processing section that processes the crushing piece M2, a stopper 4 that blocks transport of a portion of the crushing piece M2 transported by the transport section 3, and a controller 28 that controls an operation of the stopper 4 to adjust a supply amount of the raw material to the defibrating section 13. Thereby, it is possible to ensure the quantitativeness while achieving the miniaturization of the device.

In the above description, the configuration for switching to the first state, the second state, the third state, and the fourth state has been described, but the present disclosure is not limited thereto, and one of the second state and the third state may be omitted. That is, one of the first shielding plate 41 and the second shielding plate 42 may be omitted, and one of the shielding plates may be used to block a portion of the transport path 30 in the width direction. Further, the first state and the fourth state may be omitted, for example, after the fourth state, the transition to the second state may be performed to supply the raw material M2.

Further, when a detection result of the detector 52 reaches a first threshold W1 or a second threshold W2 which is a second amount less than a third threshold W3 which is a first amount in a first state, the controller 28 operates the stopper 4. Thereby, the quantitativeness can be ensured more reliably.

Further, when the detection result of the detector 52 reaches the third threshold W3, which is the first amount, the controller 28 stops the supply of the crushing piece M2, which is a raw material, to the storage section 51 of the fixed-amount supply section 5 by the stopper 4. This makes it possible to prevent or suppress the supply of an amount equal to or greater than the third threshold W3.

Further, the stopper 4 includes the first shielding plate 41 and the second shielding plate 42 which are shutter members that block at least a portion of the transport path 30 of the crushing piece M2 in the transport section 3. Thereby, the supply amount of the crushing piece M2 can be reduced more reliably.

Further, the controller 28 controls the operation of the stopper 4 based on the detection result of the detector 52. Thereby, the amount of the crushing pieces M2 can be accurately ascertained, and then the transport amount of the crushing pieces can be adjusted as described above.

The raw material is a crushing piece M2 of crushed paper, and the processing section includes the defibrating section 13 that defibrates the crushing piece M2. Thereby, for example, used paper can be recycled, or a raw material obtained from paper can be formed into another formed product.

Second Embodiment

FIG. 10 is a perspective view schematically showing a raw material supply device according to a second embodiment.

Hereinafter, the raw material supply device according to the second embodiment of the present disclosure will be described with reference to FIG. 10, but the description will focus on the differences from the above-described embodiment, and the description of the same matters will not be repeated.

As shown in FIG. 10, the stopper 4 of the raw material supply device 1 of the present embodiment includes an air flow forming portion 45. The air flow forming portion 45 has a plurality of nozzles (not shown) for ejecting air, and the nozzles are arranged side by side in a direction intersecting the transport direction of the crushing piece M2. Further, the air flow forming portion 45 is located vertically above the transport section 3, and blows air from the downstream to the upstream in the transport direction of the crushing piece M2. The air flow forming portion 45 functions as an air curtain that blows air toward the crushing piece M2 transported by the transport section 3 to form an air flow and block the crushing piece M2. Such an air flow forming portion 45 is electrically coupled to the controller 28 shown in FIG. 2, and the operation thereof is controlled.

As described above, the stopper 4 includes the air flow forming portion 45 that forms an air flow in the transport path 30 of the crushing piece M2 which is the raw material in the transport section 3. Thereby, according to the same principle as described in the first embodiment, the transport amount of the crushing piece M2 can be adjusted without providing two transport sections. Therefore, it is possible to ensure the quantitativeness while achieving the miniaturization of the device. Further, by adjusting the amount and direction of the ejected air, more delicate adjustment can be made.

Among the nozzles, by switching the timing of ejecting air between the nozzle group at the position corresponding to the first shielding plate 41 and the nozzle group at the position corresponding to the second shielding plate 42 described in the first embodiment, the same effect as that of the first embodiment can be obtained.

Further, such an air flow forming portion 45 can push the crushing piece M2 back to the upstream by ejecting air. Therefore, when the air flow forming portion 45 is operated, the pushed back crushing pieces M2 fall into the storage section 51 at once when the fourth state described in the first embodiment is changed to the first state. Therefore, in the first state, the time until the amount of the crushing pieces M2 in the storage section 51 reaches the first threshold W1 can be shortened. As a result, productivity can be increased.

Hereinbefore, the raw material supply device according to the present disclosure has been described with reference to the illustrated embodiment, but the present disclosure is not limited thereto and each section constituting the raw material supply device can be replaced with any section that can implement the same function. For example, a method may be employed in which the transport amount of the crushing piece M2 is controlled by deforming the side wall portion 312 by the controller 28 and narrowing the width of the transport lane 31 without separately providing the above-mentioned first shielding plate 41, second shielding plate 42, air flow forming portion 45, and the like. In this case, the side wall portion 312 substantially serves as the stopper 4. Further, any components may be added.

What is claimed is:

1. A raw material supply device comprising:
   a transport section that transports a raw material containing fibers and supplies the raw material to a processing section that processes the raw material;
   a stopper that blocks transport of a portion of the raw material transported by the transport section, the stopper including a first member and a second member each of which partially blocks the transport of the portion of the raw material; and
   a controller that controls an operation of the stopper to adjust a supply amount of the raw material to the processing section,
   the controller, to adjust the supply amount of the raw material,
      controlling both of the first member and the second member not to block the transport in a first state,
      controlling only the first member to block the transport while controlling the second member not to block the transport in a second state after the first state,
      controlling only the second member to block the transport while controlling the first member not to block the transport in a third state after the second state, and
      controlling both of the first member and the second member to block the transport in a fourth state after the third state.

2. The raw material supply device according to claim 1, further comprising a fixed-amount supply section that intermittently supplies the raw material transported by the transport section to the processing section by a first amount.

3. The raw material supply device according to claim 2, wherein the fixed-amount supply section includes a receiving portion that receives the raw material transported by the transport section and a detector that detects an amount of the raw material in the receiving portion.

4. The raw material supply device according to claim 3, wherein the controller controls the operation of the stopper based on a detection result of the detector.

5. The raw material supply device according to claim 3, wherein the controller operates the the first member when a detection result of the detector reaches a second amount less than the first amount in the first state.

6. The raw material supply device according to claim 3, wherein the controller stops supplying the raw material to the fixed-amount supply section by the stopper when a detection result of the detector reaches the first amount.

7. The raw material supply device according to claim 1, wherein the each of the first member and the second member is a shutter member that blocks at least a portion of a transport path of the raw material in the transport section.

8. The raw material supply device according to claim 1, wherein the stopper includes an air flow forming portion, and the air flow forming portion includes the first member and the second member each of which is a nozzle group that has a plurality of nozzles and blows air from a downstream side to an upstream side of a transport direction of the raw material in the transport section to partially block the transport of the portion of the raw material.

9. The raw material supply device according to claim 1, wherein the raw material is a crushing piece of crushed paper, and
the processing section includes a defibrating section that defibrates the crushing piece.

* * * * *